US007793692B2

(12) United States Patent
Nguyen et al.

(10) Patent No.: US 7,793,692 B2

(45) Date of Patent: Sep. 14, 2010

(54) PNEUMATIC TIRE TREAD HAVING SIPE THAT DEVOLVES INTO GROOVE AS TREAD WEARS

(75) Inventors: Gia Van Nguyen, Rossignol (BE); Joël André Ghislain Delogne, Neufchâteau (BE); Anne-France Gabrielle Jeanne-Marie Cambron, Luxembourg (LU); Frank Severens, Frassem-Arlon (BE); Jean Joseph Collette, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 226 days.

(21) Appl. No.: 11/262,708

(22) Filed: Oct. 31, 2005

(65) Prior Publication Data

US 2007/0095447 A1 May 3, 2007

(51) Int. Cl.
*B60C 11/12* (2006.01)

(52) U.S. Cl. ............................ 152/209.21; 152/209.23; 152/DIG. 3

(58) Field of Classification Search ............ 152/209.18, 152/209.21, 209.23, DIG. 3
See application file for complete search history.

(56) References Cited

U.S. PATENT DOCUMENTS

| | | | | |
|---|---|---|---|---|
| 2,121,955 | A | 6/1936 | Eger | 152/209 |
| 5,316,063 | A | 5/1994 | Lagnier | 152/209 R |
| 6,102,092 | A | 8/2000 | Radulescu | 152/209.19 |
| 6,116,310 | A * | 9/2000 | Shinohara | 152/DIG. 3 |
| 6,123,130 | A | 9/2000 | Himuro et al. | 152/209.3 |
| 6,408,910 | B1 * | 6/2002 | Lagnier et al. | 152/DIG. 3 |
| 6,467,517 | B1 | 10/2002 | Radulescu | 152/209.2 |
| 6,561,242 | B2 | 5/2003 | Chaen et al. | 152/209.18 |
| 6,601,623 | B1 | 8/2003 | Katayama | 152/209.15 |
| 6,668,886 | B1 | 12/2003 | Iwamura | 152/209.18 |
| 6,681,824 | B2 | 1/2004 | Lopez | 152/209.21 |
| 6,907,910 | B2 | 6/2005 | Iwamura | 152/209.18 |
| 2002/0017349 | A1 | 2/2002 | Lopez | 152/209.18 |
| 2002/0139164 | A1 * | 10/2002 | Ishihara | 152/DIG. 3 |
| 2003/0201048 | A1 * | 10/2003 | Radulescu et al. | 152/209.18 |
| 2005/0109438 | A1 * | 5/2005 | Collette et al. | 152/209.18 |

FOREIGN PATENT DOCUMENTS

| | | | |
|---|---|---|---|
| EP | 1 533 141 A1 | | 5/2005 |
| FR | 2 763 892 | | 12/1998 |
| JP | 2001-130227 | * | 5/2001 |
| JP | 2003-118322 | * | 4/2003 |
| JP | 2005-104194 | * | 4/2005 |
| WO | WO 99/48707 | | 9/1999 |
| WO | WO 02/38399 A2 | | 5/2002 |

OTHER PUBLICATIONS

European Search Report, completed Feb. 13, 2007.

* cited by examiner

*Primary Examiner*—Steven D Maki
(74) *Attorney, Agent, or Firm*—June E. Rickey

(57) ABSTRACT

A pneumatic tire tread has tread elements formed by circumferential and/or lateral grooves. At least one tread element has a sipe that devolves from a constant width sipe having a three dimensional aspect in at least a portion of the radially outer portion of the sipe to a wider width groove at the base of the tread feature.

13 Claims, 5 Drawing Sheets

10
14
CL
20
12
22
$W_o$
16
34
D
$D_t$
18
24
$W_i$

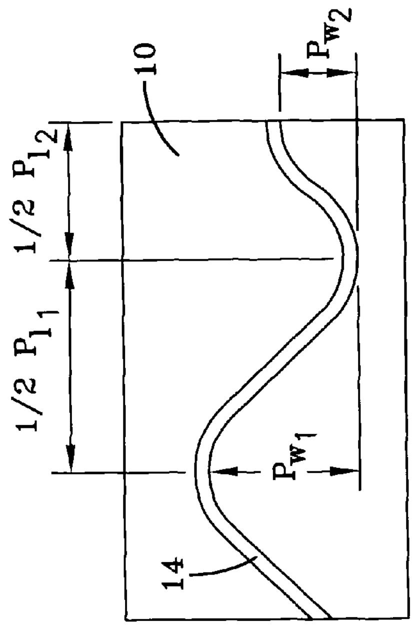
FIG-3B
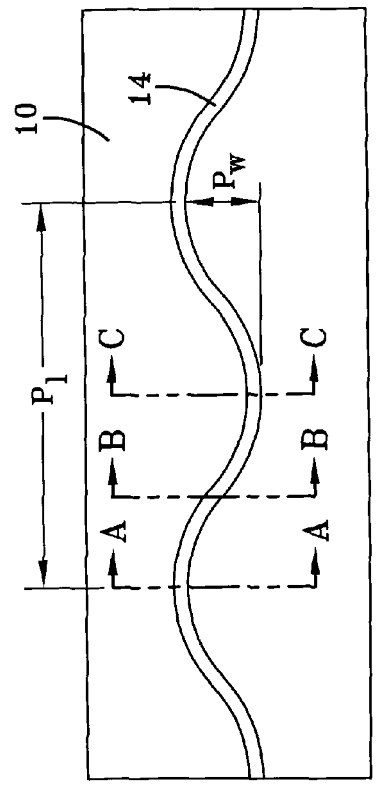
FIG-3A
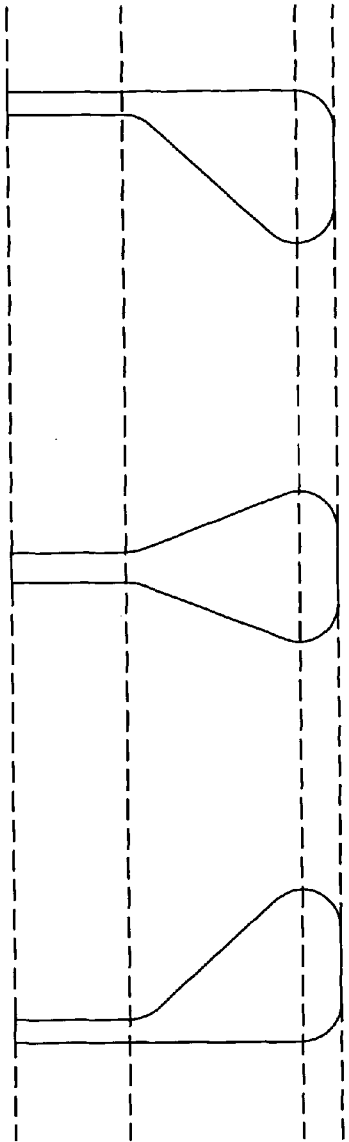
FIG-4A
FIG-4B
FIG-4C

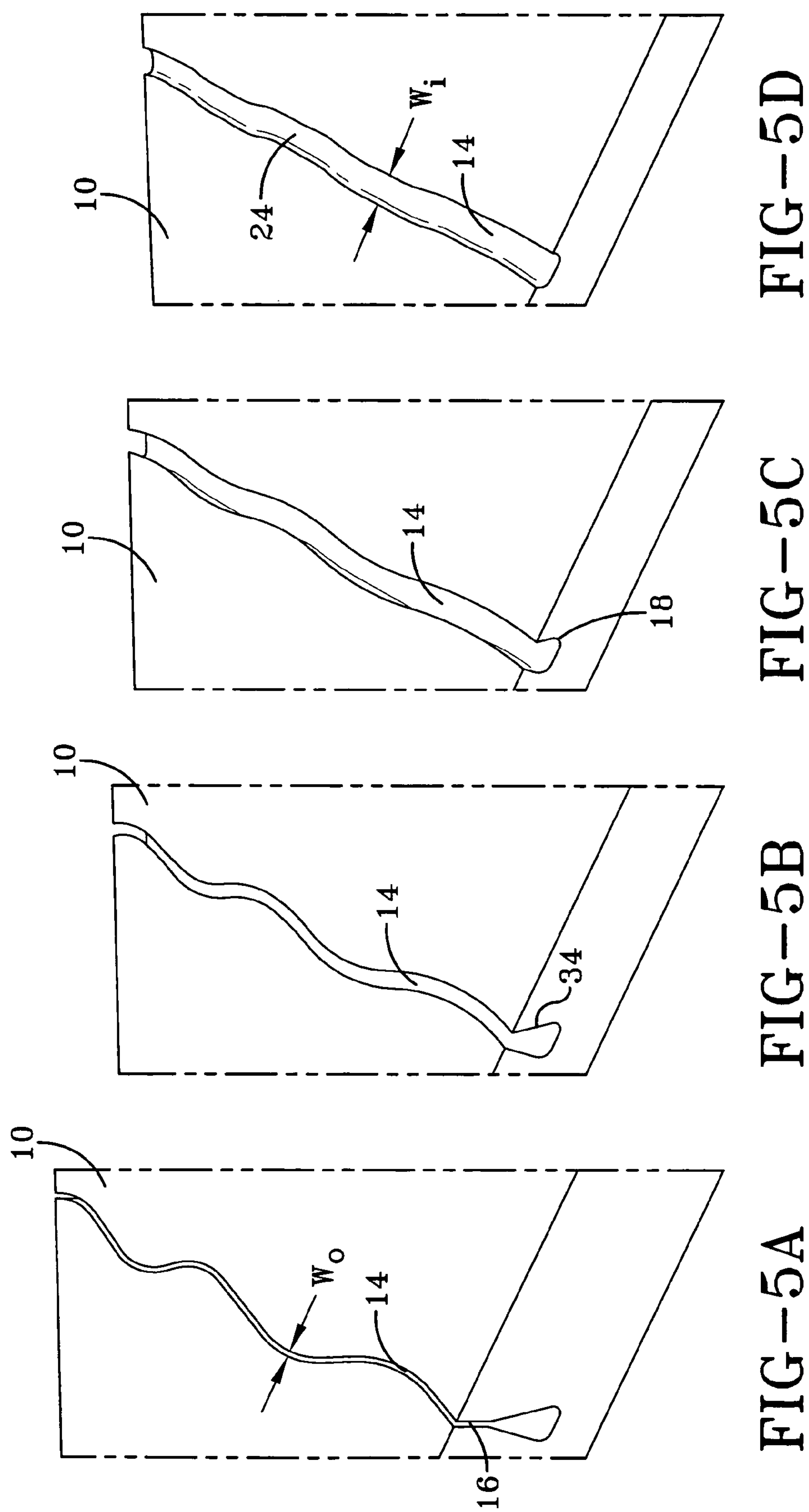
10
14
24
$W_i$
FIG—5D
10
14
18
FIG—5C
10
14
34
FIG—5B
10
$W_o$
14
16
FIG—5A

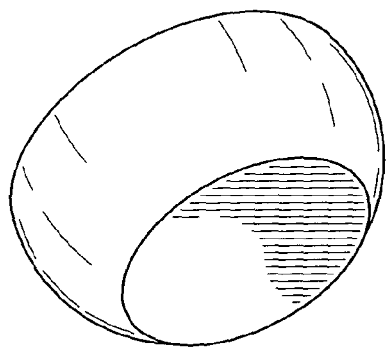
FIG–7a
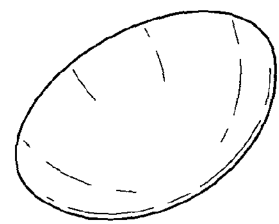
FIG–7b
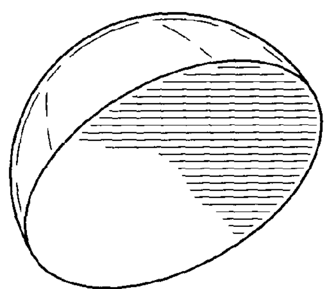
FIG–7c
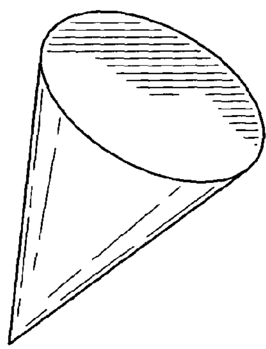
FIG–7d
FIG–7e
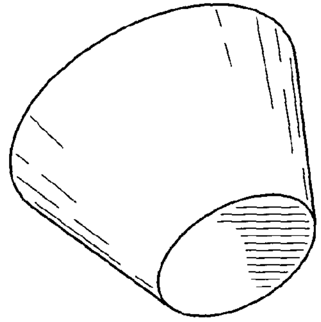
FIG–7f
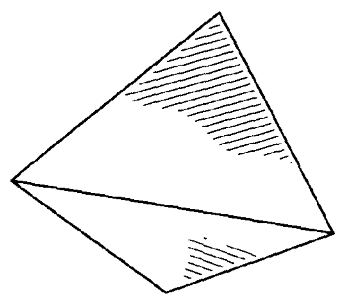
FIG–7g
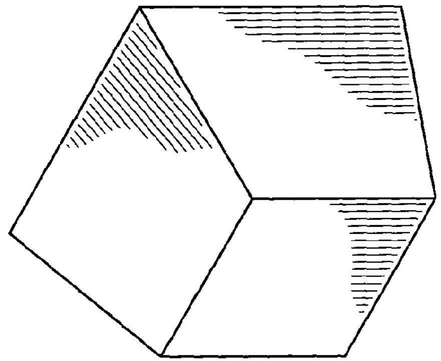
FIG–7h

PNEUMATIC TIRE TREAD HAVING SIPE THAT DEVOLVES INTO GROOVE AS TREAD WEARS

FIELD OF THE INVENTION

The present invention is directed to a pneumatic tire. More particularly, the present invention is directed to a tire tread wherein the tread is provided with a three dimensional sipe that devolves into a groove as the tread wears.

BACKGROUND OF THE INVENTION

When a tire tread is worn, the groove volume decreases, reducing the tire's ability to channel water away from the tire footprint, reducing wet road performance. For some tread configurations, even if the tire tread has not worn down to the legal minimum non-skid depth, the tire's wet road performance of the tire may be severely limited.

However, decreasing the net to gross ratio of the new tread in an attempt to increase the worn groove volume reduces the new tire tread stiffness, reducing tire handling and wear performance. In such a low net to gross, to compensate for increased grooves, the tread depth may be increased; however, this may also lead to greater block movement, reducing the tread stiffness.

The present invention is directed to a tire tread wherein the siping configuration yields a tread element with a desired new tire stiffness, and a worn tire wet road performance.

SUMMARY OF THE INVENTION

Disclosed herein is a tire tread designed to have a variable tread pattern. The tread pattern changes with wear to achieve similar tread performance for the tire when both new and worn. The changing pattern optimizes the worn tire performance in an attempt to maintain the tire's wet performance characteristics.

Disclosed is a tire tread having at least one circumferentially extending or laterally extending main groove partially forming at least one tread element. The tread element having a sipe therein. The sipe is an evolving sipe wherein the sipe has a radially outer portion and a radially inner portion. A portion of the radially outer sipe portion has a three dimensional configuration and a constant width Wo. The radially inner sipe portion has a width Wi greater than the width Wo of the radially outer portion.

In one aspect of the invention, the radially outer sipe portion of the evolving sipe is the radially outer 20 to 60% of the sipe depth. Preferably, the radially outer sipe portion is the radially outer 30 to 50% of the sipe depth. Converse with these dimensions, the radially inner sipe portion is the radially inner 10 to 50% of the sipe depth. Preferably, the radially inner sipe portion is the radially inner 20 to 45% of the sipe depth. The evolving sipe may have an intermediate portion between the radially outer portion and the radially inner portion; the intermediate portion having a variable width in the depth direction of the sipe. The radially outer portion and the intermediate portion may have a undulating profile in the longitudinal direction along the entire length L of the sipe wherein the amplitude of the undulating portion of the intermediate portion decreases from the radially outer portion to the radially inner portion and, in a cross section of the tread element parallel to the tread surface, the undulating portion of the intermediate portion has a substantially constant width along the entire length L.

In another aspect of the invention, the radially inner sipe portion has a width Wi at least 2.5 times the radially outer sipe portion width Wo. Preferably, the radially outer sipe portion has a width in the range of 0.3 to 1.0 mm, and the radially inner sipe portion has a width of in the range of about 1.0 to 10.0 mm.

In another aspect of the invention, the portion of the radially outer portion having a three dimensional configuration has a zig-zag or sinusoidal configuration or is a series of protrusions and recesses. When formed of protrusions and recesses, the shape of the three dimensional elements may be in the shape of segments of a sphere, of an ellipsoid, or polygons of at least three sides.

In another aspect of the invention, the radially inner portion of the sipe has a substantially straight configuration. Alternatively, the radially inner portion of the sipe has a non-straight configuration. Additionally, the radially inner portion of the sipe may have a three dimensional configuration defined by a pitch width less than a pitch width of the radially outer portion of the sipe.

DEFINITIONS

The following definitions are controlling for the disclosed invention.

"Blade" means a protrusion in a tire curing mold that forms part of the tread design. The protrusion forms a corresponding depression in the finished tire tread.

"Groove" means an elongated void area in a tread that may extend circumferentially or laterally about the tread in a straight curved, or zigzag manner. Circumferentially and laterally extending grooves sometimes have common portions and may be sub classified as "wide" or "narrow." A "narrow groove" has a width greater than a sipe, but less than or equal to about 4.0 mm and a "wide groove" has a width greater than about 4.0 mm. The groove width is equal to tread surface area occupied by a groove or groove portion, the width of which is in question, divided by the length of such groove or groove portion; thus, the groove width is its average width over its length.

"Radial" and "radially" are used to mean directions radially toward or away from the axis of rotation of the tire.

"Sipes" refer to very narrow width grooves molded into tread elements of a tire that subdivide the tread elements. Sipes have a width in the range of about 0.3 mm to about 1.0 mm. The width of a sipe is such that the sipe tends to close completely in a tire footprint.

BRIEF DESCRIPTION OF THE DRAWINGS

The invention will be described by way of example and with reference to the accompanying drawings in which:

FIGS. 3A-3B are top views of evolving sipes;

FIGS. 4A-4C are sectional views of a sipe along the corresponding lines in FIG. 3;

FIGS. 5A-5D illustrate the tread element during various stages of wear;

FIGS. 7A-7H illustrate alternative embodiments for the protrusions and recesses for the radially outer portion of the sipe.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
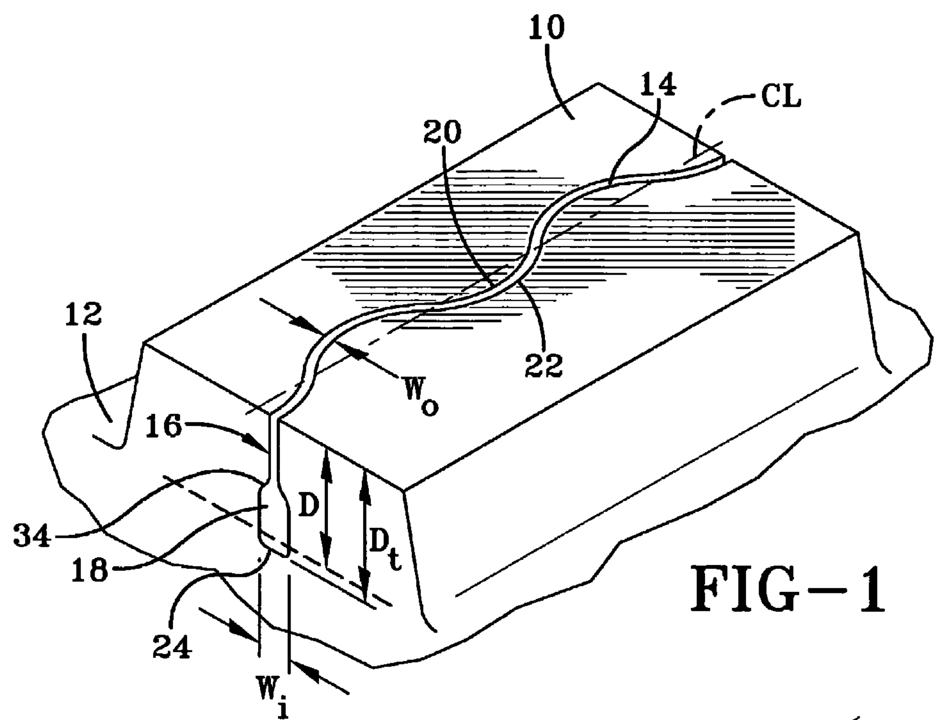
FIG. 1 is a perspective view of a tread element in accordance with the invention.

FIG. 1 is a tread element 10 for a pneumatic tire tread. As appreciated by those skilled in the art, the tread element 10 is formed by at least one groove 12, the groove 12 being either a circumferentially extending or laterally extending groove. If the tread element 10 is defined by only circumferentially extending grooves, the tread element will be a tread rib. If the tread element 10 is formed by grooves on at least three sides, the tread element 10 is considered a tread block. The tread element 10 may be located in any position on the tread surface, i.e. along a tread shoulder, along the centerline, or an intermediate position. The depth of the grooves 12 forming the tire tread elements defines the non-skid depth D of the tread. If there are grooves of differing depths, the maximum groove depth will define the non-skid depth of the tread.

Located within the tread element 10 is at least one evolving sipe 14. The sipe 14 is illustrated as subdividing the tread element 10 into two portions; however, the tread element 10 may have multiple evolving sipes 14. The sipe 14 may have a general inclination in either the lateral or circumferential direction of the tire; the exact orientation of the sipe 14 relative to the tread is within the purview of the tread designer.

The evolving sipe 14 is so named as it evolves from a radially outer portion 16 having a width within the width range conventional for a tread sipe to a radially inner portion 18 having a width conventional for a groove, see also FIGS. 4A-4C. The radially outer sipe portion 16 has a width Wo in the range of 0.3 to 1.0 mm. Preferably, the width Wo is constant; however, the width of the radially outer sipe portion may vary so long as the width Wo is within the above stated range. The radially inner sipe portion 18 has a width Wi at least 2.5 times the width Wo of the radially outer sipe portion 16. Preferably, the radially inner sipe portion 18 has a width Wi in the range of 1.0 to 10.0 mm. More preferably, the radially inner sipe portion 18 has a width Wi in the range of about 4.0 to about 8.0 mm. The width of the radially inner sipe portion 18 is limited solely by the ability to demold the tire and remove the forming blade without destroying the radially outer sipe portion 16.

The radially outer sipe portion 16 having the narrow sipe width is the radially outer 20 to 60% depth Do of the full sipe depth Dt. Preferably, the radially outer sipe portion 16 has a depth Do of 30-50% of the upper portion of the full sipe depth Dt. The radially inner sipe portion 18 having a groove width is the radially inner 10 to 50% depth Db of the full sipe depth Dt. Preferably, the groove width portion of the sipe is the radially inner 20 to 45% depth Db of the full sipe depth Dt.

Also, in accordance with the invention, the radially outer sipe portion 16 may have a three dimensional configuration wherein the opposing sipe walls 20, 22 interlock against one another as the tread element 10 passes through the tire footprint. The three dimensional configuration may be defined as three dimensional relative to a theoretical sipe centerline CL, the sipe centerline CL extending from one sipe end to the opposing sipe end. The radially outer sipe portion 16 of FIG. 1 is a wavy, or sinusoidal, configuration. The sinusoidal configuration may have more sharp, or defined, peaks, creating a zig-zag configuration.

In a preferred embodiment, the radially inner sipe portion 18 has a substantially straight configuration with a constant depth. By substantially straight configuration, it is intended that the base 24 of the evolving sipe 14 may have a slight curvature, but any curvature is significantly less than any curvature of the radially outer sipe portion 16. For example, the sinusoidal portion of the sipe 14 may have a radius of about 6.5 mm, while the base has a radius of greater than 50 mm. For such a large radius of curvature for the base 24, when the sipe 14 has an actual short length, the sipe base 24 will appear to be substantially straight.

Alternatively, the radially inner sipe portion 18 may have a configuration that varies in shape, width, and/or depth. At a minimum, per the invention above, the radially inner sipe portion 18 has a width of at least equal to that of a groove, though variations in the width are permissible, such as a narrowing and widening of the radially inner sipe portion 18. Varying the shape of the radially inner sipe portion 18 may be accomplished by forming a three-dimensional configuration such as a bend, an undulation, or zig-zag configuration to that sipe portion 18. The three dimensional configuration of the radially inner sipe portion 18 may mimic the three-dimensional configuration of the radially outer sipe portion 16. If there is an exact mimic, the pitch width and pitch length are comparable to one another, plus or minus 10% of the values for the radially outer sipe portion. Preferably, the radially inner sipe portion 18 has a pitch width less than the pitch width of the radially outer sipe portion 16.

Figure 2:
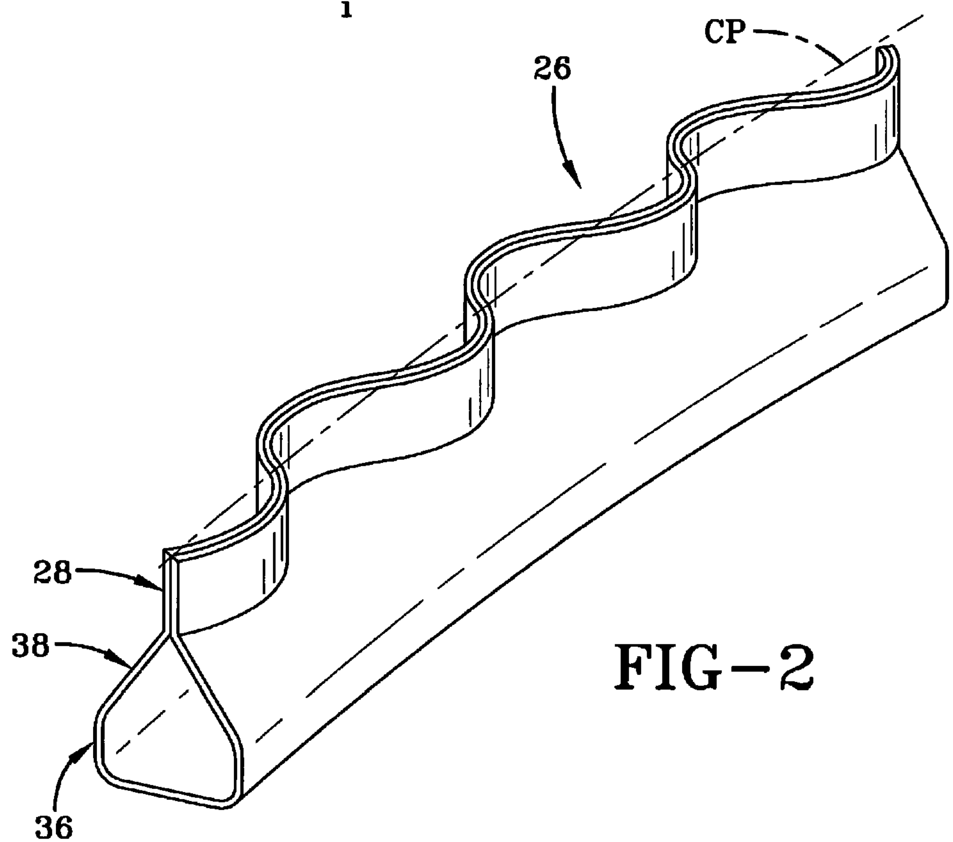
FIG. 2 is an exemplary blade used to form one embodiment of the invention.

FIG. 2 illustrates a blade used 26 to form the sipe 14 of FIG. 1. During molding of the tire tread, the blade 26 forms an evolving sipe 14 that has a profile corresponding to the blade configuration. Thus, in the following discussion, references to the blade pattern and dimensions are also applicable to the sipe 14 formed therefrom and may be so referred to.

The radially outer portion 28 of the blade 26 has a multi-dimensional configuration along a centerplane CP of the blade 26, and subsequent sipe 14. The pattern is defined by a pitch length Pl, the length of the blade 26/sipe 14 between repeating elements along the length of the pattern, and a pitch width Pw, the maximum width of the pitch length, see FIG. 3A. The pitch length Pl and pitch width Pw are measured relative to the blade 26/sipe 14 itself and are independent of the evolving sipe 14 orientation in the actual tire tread. The pitch length Pl is in the range of 5 to 100% of the sipe length Ls, preferably 10 to 50% of the sipe length Ls to yield a pattern having 2 to 6 repeating pitch lengths. The actual measurement of the pitch length Pl is dependent upon the tire size and may vary with conventional noise pitching of the tread element 10 of the tire. The pitch width Pw is in the range of 10 to 50% of the pitch length Pl of the configuration.

In the sipe 14 of FIG. 3A, the sipe 14 has a constant pitch length Pl and pitch width Pw along the length Ls of the sipe 14. The pitch length Pl may vary along the sipe length Ls and/or the pitch width Pw may also vary along the sipe length Ls, see FIG. 3B. In the sipe 14 of FIG. 3B, the second element 30 of the multi-dimensional configuration has a pitch width Pw2 of approximately one-half the pitch width Pw1 of the first element 32 of the configuration. Additionally, the second element 30 of the configuration has a pitch length Pl2 of over one-half the pitch length Pl1 of the first element 32 of the configuration.

As also seen in FIGS. 1 and 2, the sipe 14/blade 26 has an intermediate depth portion 34, 38 located between the radially outer portions 16, 28 and the radially inner portions 18, 36 of the sipe 14 and blade 26. The intermediate portion 34, 38 has a depth Di ranging from 15 to 60% of the sipe depth Dt, see also FIGS. 4A-4C. Preferably, the intermediate portion 34, 38 has a depth of 25 to 50% of the sipe depth Dt. The intermediate depth sipe portion 34 is characterized by a gradually increasing width, transitioning the sipe 14 from the sipe width Wo to the groove width Wi.

A series of blades 26 were prepared to form different sipes 14 in tire tread elements 10. All of the blades 26 and formed evolving sipes 14 had radially outer portions 16, 28 having a sinusoidal configuration; dimensions for the formed blades 26 and sipes 14 are provided in the Table below. All of the ratios of pitch length Pl to pitch width Pw, ratios of the sipe portions widths and the different percentages for the sipe portion depths are all within the scope of the present invention.

TABLE

| | Blade/Sipe 1 | Blade/Sipe 2 | Blade/Sipe 3 | Blade/Sipe 4 | Blade/Sipe 5 |
|---|---|---|---|---|---|
| ½ Pl, mm | 8.75 | 8.75 | 15.20 | 15.00 | 6.00 |
| Pw, mm | 4.00 | 6.00 | 3.40 | 6.00 | 5.40 |
| Pw/Pl % | 22.86 | 34.29 | 11.18 | 20.00 | 45.00 |
| Do, mm | 3.00 | 3.00 | 2.90 | 3.00 | 3.00 |
| Do % | 35.29 | 35.29 | 31.87 | 37.50 | 31.58 |
| Di, mm | 4.50 | 3.00 | 2.50 | 4.00 | 3.00 |
| Di % | 52.94 | 35.29 | 27.47 | 50.00 | 31.58 |
| Db, mm | 1.00 | 2.50 | 3.70 | 1.00 | 3.50 |
| Db % | 11.76 | 29.41 | 40.66 | 12.50 | 36.84 |
| Dt, mm | 8.50 | 8.50 | 9.10 | 8.00 | 9.50 |
| Wo, mm | 0.60 | 0.80 | 0.80 | 0.60 | 0.60 |
| Wb, mm | 4.00 | 6.00 | 6.10 | 8.00 | 8.10 |
| Wb/Wo | 6.67 | 7.5 | 7.63 | 13.33 | 13.50 |

FIGS. 5A-5D illustrate the transition of the evolving sipe 14 as the tread element 10 is worn. When the tread element 10 is unworn, the sipe 14 has the very narrow width conventionally associated with a sipe. The sipe 14 has a three dimensional configuration thereto. As the sipe 14 is worn down, the width of the sipe 14 gradually increases, see FIGS. 5B-5C. After significant wear, but before the tire wear has reached a point wherein the tire is considered non-operation, see FIG. 5D, the sipe width has increased to that within the ranges defined above and the overall configuration is substantially straight.

Figure 6:
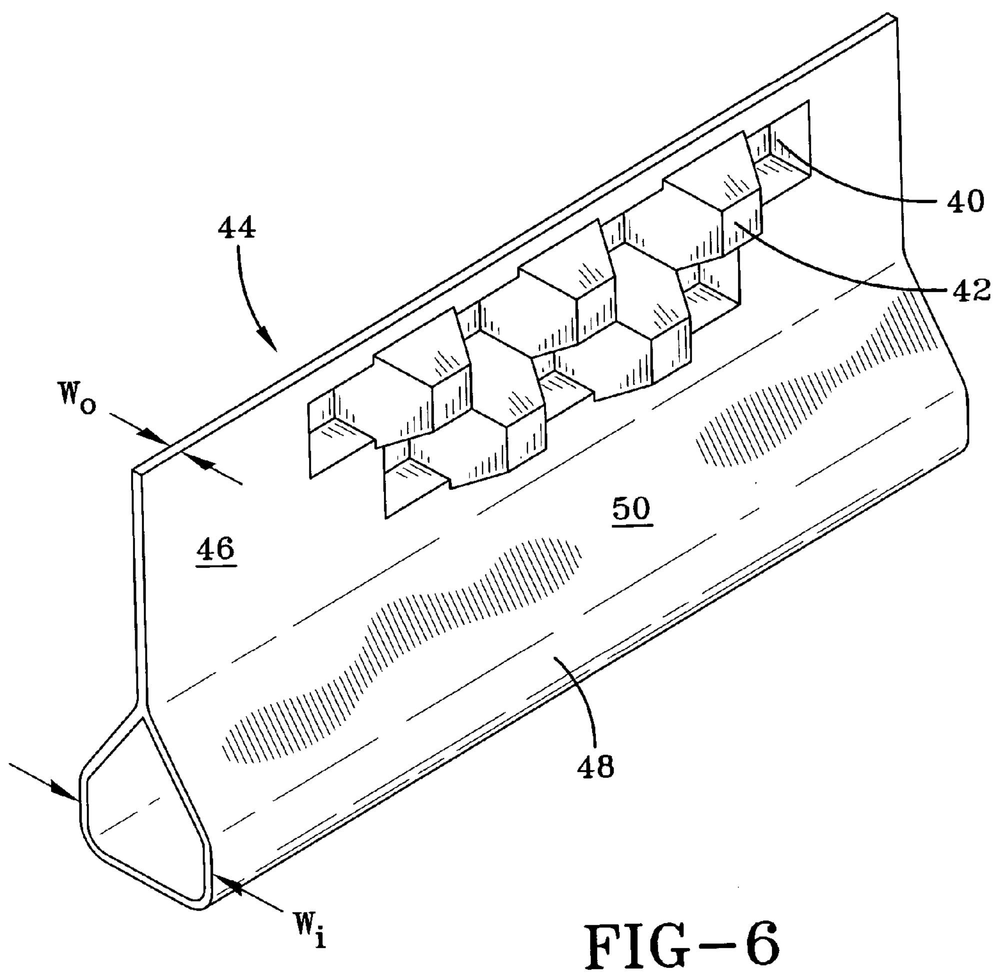
FIG. 6 illustrates another embodiment of the invention.

Alternatively, the three dimensional configuration of the radially outer sipe portion 16 may be formed by a series of alternating recesses 40 and protrusions 42 extending from each side of the sipe centerline CL. One exemplary blade 44 for such a sipe is illustrated in FIG. 6. The upper portion 46 of the blade 44, and specifically, the blade portion 46 that forms the radially outer sipe portion 16, has a plurality of alternating recesses 40 and protrusions 42 extending from each side of the blade 44. In the resulting sipe, the upper sipe portion 16 is three dimensional, but maintains a constant sipe width. The inner portion 48 of the blade 44 has a width Wi substantially greater than the outer portion width Wo, and within the above discussed ranges. The intermediate portion 50 has a constantly increasing width, and is characterized as being symmetrical along the length of the evolving sipe, relative to the sipe centerline CL.

The recesses 40 and protrusions 42 may also be in the form of a zone of a sphere (FIG. 7A), segments of a sphere (FIG. 7B), hemispherical (FIG. 7C), spherical cone (FIG. 7D), ellipses (FIG. 7E), a truncated cone (FIG. 7F), cylindrical, or any plurality of three dimensional polygonal configurations such as triangular, rectangular, octagonal, and pentagonal (see FIGS. 7G, 7H). The alternating recesses 40 and protrusions 42 may be spaced from one another or may be directly adjacent to one another. Adjacent three dimensional recesses and protrusions are disclosed and described in greater detail in U.S. patent application Ser. No. 10/717,780, filed Nov. 20, 2003, while another type of spaced alternating recesses and protrusions are disclosed and described in U.S. patent application Ser. No. 11/133,008, filed May 19, 2005; both applications are fully incorporated herein by reference thereto.

When the three dimensional aspect of the radially outer sipe portion 16 is formed by alternating recesses 40 and protrusions 42, the sipe 14 may or may not have an intermediate section 34 having similar recesses 40 and protrusions 42. The intermediate section 34 may be formed with smooth blade walls, or the sipe 14 may not have any intermediate section 34. If the sipe 14 does not have an intermediate section 34, removal of the blade 26, 44 from the molded tread may be more challenging; thus the lack of an intermediate section 34 is more likely with a sipe 14 having a small radially inner portion 18, relative to the full depth Dt of the sipe 14.

Additionally, the sipe 14 in FIG. 1 is illustrated as having a depth Dt greater than the non-skid tread depth D. The sipe depth Dt is preferably in the range of 80-120% of the nonskid tread depth D. When the sipe depth Dt is equal or greater than the non-skid tread depth D, the presence of the groove formed by the evolving sipe 14 is ensured during the entire useful life of the tire tread.

While not illustrated, the radially outer sipe portion 16 may have multiple three dimensional configurations therein, wherein a minor three-dimensional pattern is superimposed upon a dominant three dimensional pattern. In such a sipe, three dimensional recesses 40 and protrusions 42, such as those illustrated in FIGS. 6-**7*h*, would be the minor three-dimensional pattern and may be formed in a sipe having a dominant sinusoidal or zig-zag configuration, such as those illustrated in FIGS. 1-5B**.

What is claimed is:

1. A tire tread, the tread having at least one circumferentially extending or laterally extending main groove, the maximum radial depth of the at least one main groove defining a non-skid tread depth, the at least one main groove partially forming at least one tread element, the at least one tread element having a sipe therein, wherein the sipe has a radially outer portion and a radially inner portion and an intermediate portion located therebetween, wherein the intermediate portion has an increasing width transitioning from a width Wo to a width Wi, and wherein the sipe has a length L which extends in the longitudinal direction, the radially outer portion having a width Wo and the radially inner portion has a width Wi, wherein the radially inner portion extends radially outward from a base portion with straight sidewalls having a defined depth D, wherein Wi is greater than Wo, wherein the radially outer portion and the intermediate portion have a undulating profile in the longitudinal direction along the entire length L, wherein the amplitude of the undulating portion of the intermediate portion decreases from the radially outer portion to the radially inner portion and, in a cross section of the tread element parallel to the tread surface, the undulating portion of the intermediate portion has a substantially constant width along the entire length L and the radially inner portion is straight along the longitudinal direction along the entire length L.

2. The tread of claim 1 wherein the radially outer sipe portion is the radially outer 20 to 60% of the sipe depth.

3. The tread of claim 1 wherein the radially outer sipe portion is the radially outer 30 to 50% of the sipe depth.

4. The tread of claim 1 wherein the radially inner sipe portion is the radially inner 50 to 10% of the sipe depth.

5. The tread of claim 1 wherein the radially inner sipe portion is the radially inner 20 to 45% of the sipe depth.

6. The tread of claim 1 wherein the radially inner sipe portion has a width Wi at least 2.5 times the radially outer sipe portion width Wo.

7. The tread of claim 1 wherein the radially outer sipe portion has a width in the range of 0.3 to 1.0 mm, and the radially inner sipe portion has a width of in the range of about 1.0 to 10.0 mm.

8. The tread of claim 1 wherein the radially outer sipe portion has a constant width Wo.

9. The tread of claim 1 wherein the radially outer sipe portion has a variable width in the range of 0.3 to 1.0 mm.

10. The tread of claim 1 wherein the radially outer portion has a sinusoidal configuration.

11. The tread of claim 1 wherein the radially outer portion has a zigzag configuration.

12. The tread of claim 1 wherein the radially outer portion has a series of protrusions and recesses in the shape of segments of a sphere, of an ellipsoid, or a polygon of at least three sides.

13. The tread of claim 1 wherein the sipe has a depth greater than non-skid tread depth.

* * * * *